UNITED STATES PATENT OFFICE.

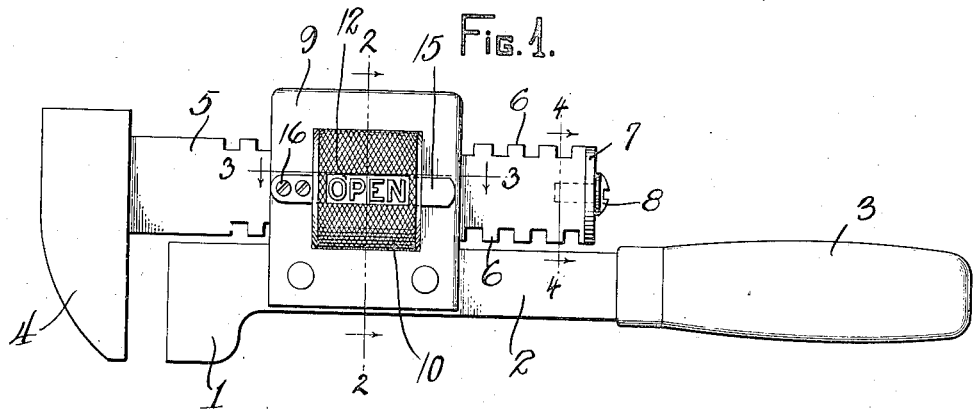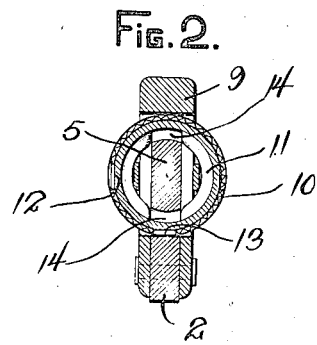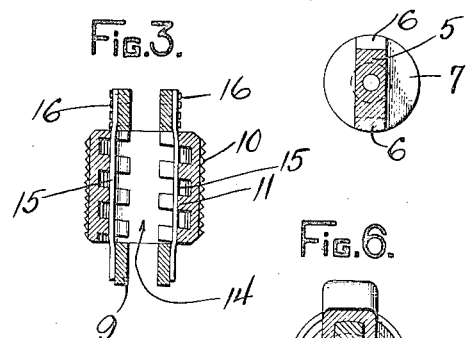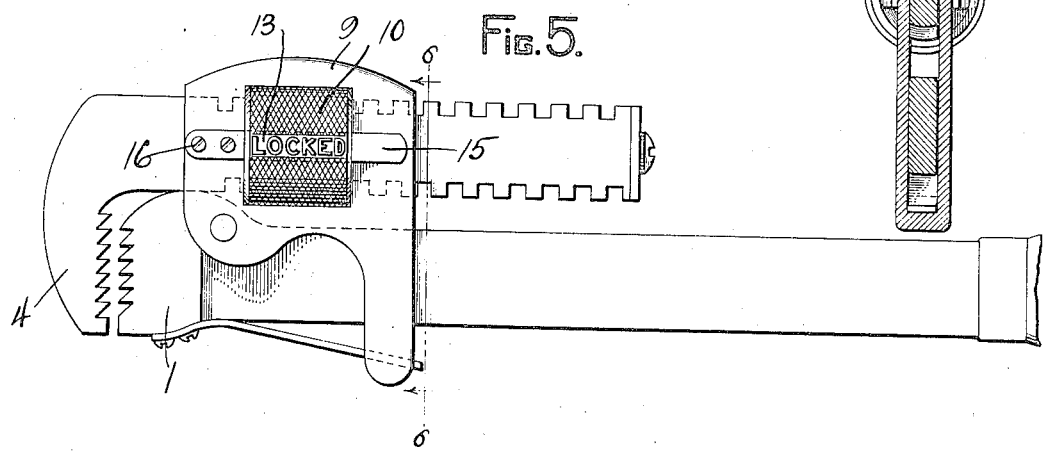

JULIUS C. FJERDINGSTAD, OF LOS ANGELES, CALIFORNIA.

WRENCH.

1,194,612.  Specification of Letters Patent.  Patented Aug. 15, 1916.

Application filed March 21, 1916. Serial No. 86,149.

*To all whom it may concern:*

Be it known that I, JULIUS C. FJERDINGSTAD, a subject of the King of Denmark, residing at Los Angeles, in the county of Los Angeles and State of California, have invented certain new and useful Improvements in Wrenches, of which the following is a specification.

This invention relates to wrenches and more particularly to pipe and monkey-wrenches the primary object being to devise an improved means for quickly adjusting the jaws of the wrench to fit any particular size of nut or pipe and one which will be as efficient and as strong as the ordinary wrench, which is opened by means of a nut screw.

A further object of this invention is to provide a novel type of wrench which consists of comparatively few parts and is simple in construction, but durable and well adapted to withstand the rough usage to which devices of this character are ordinarily subjected.

For a full description of the invention and the advantages and merits thereof, reference is made to the following description and the accompanying drawings, wherein is illustrated the preferred form of my invention, in which;

Figure 1 is a side elevation of a monkey-wrench showing the invention applied thereto. Fig. 2 is a vertical section on the line 2—2 of Fig. 1. Fig. 3 is a horizontal section on the line 3—3 of Fig. 1 showing the threaded shank removed. Fig. 4 is a vertical section on the line 4—4 of Fig. 1. Fig. 5 is a side elevation showing my invention applied to a pipe-wrench. Fig. 6 is a vertical section on the line 6—6 of Fig. 5.

The monkey-wrench is provided with the stationary jaw 1 which is integrally formed with the shank 2 upon the end of which the handle 3 is mounted. The movable jaw 4 has a shank 5 which is provided with the screw threads 6 on each of its edges and the end of the shank has a washer 7 secured by a fastening screw 8, the washer 7 preventing the movable jaw from becoming displaced from the wrench.

Mounted upon the stationary jaw 1 is a housing 9 through the longitudinal center of which the threaded shank 5 is extended. An adjusting nut 10 has interior threads 11 which engage with the threads 6 of the shank 5 and the diameter of the nut 10 being greater than the thickness of the housing 9, the nut extends outwardly through the side openings of the housing 9 and may be grasped by the fingers of the operator for the purpose presently described. The face of the nut 10 is knurled whereby the finger of the operator may more conveniently turn the nut. The nut 10 is provided with two flat surfaces 12 and 13 which are spaced quarter way around the circumference of the nut and bear the printed words "Open" and "Locked." The interior of the nut has two cut-out portions 14 which are arranged opposite to each other and extend through the interior threads 11 for a depth sufficient to allow the nut to slide longitudinally free of the shank 5. In the position shown in Fig. 1 of the drawing, the word "open" appearing at the side of the nut, the openings or recesses 14 will be in position to allow the movable jaw to be moved in the desired position to grasp a particular size nut. When the jaw has been adjusted to the desired size, the nut will be turned until the word "locked" appears on the side of the nut and this rotation of the nut will cause the threads 11 to engage the threads 6 of the threaded shank 5 thereby locking the movable jaw in the desired position.

It will be necessary, of course, to hold the nut 10 in the position above described. To accomplish this, each side of the housing 9 is provided with a leaf spring 15 which is fastened to the housing by screws 16 at one end of the spring and the spring extends through the threaded opening in the nut and across the side openings in the sides of the housing 9 and out through the opposite end of the opening in the nut. By reference to Fig. 3 of the drawing it will be observed that the leaf springs 15 engage the threads 11 of the nut 10 when the nut is in open position. When the nut is turned to locked position the springs 15 will spring outwardly and enter the recesses 14 thereby effectively locking the nut which, in turn, also locks the movable jaw in the position for turning the particular size of nut.

In the modification shown in Fig. 5 the application of the invention to a pipe-wrench is illustrated. The operation of the device is exactly the same in the pipe-wrench. Fig. 6 illustrates the locked position of the wrench.

From the foregoing it will be observed that a very simple and durable wrench has been provided, the details of which embody the preferred form. I desire it to be understood however, that slight changes or modifications in the minor details of construction may be made without departing from the spirit of the invention or the scope of claims hereunto appended.

I claim:

1. In a wrench, the combination of a pair of jaws, a shank for each of said jaws one of which is provided with screw threads, a housing mounted upon one of the shanks and having said screw threaded shank extending longitudinally through the housing, said housing provided with an opening in each of its sides, a nut surrounding said screw threaded shank and extending through the side openings in said housing, leaf springs secured to said housing at one edge thereof and extending through said nut and across the openings in the sides of said housing, said nut provided with recesses in which said leaf springs are adapted to register when said nut is turned to locked position.

2. In a wrench, the combination with a pair of jaws one movable and the other stationary, said stationary jaw having a shank provided with a handle, said movable jaw having its shank provided with threads, a housing secured to the shank of said stationary jaw and provided with openings in its sides, a nut arranged in said housing and provided with interior threads, said threads having oppositely arranged cut-out portions whereby the threads of said nut may be disengaged from the threads of said shank, spring elements having one end secured to said housing and extending across the opening in said housing and through the threaded opening of said nut for frictionally engaging the threads of said nut.

3. In a wrench, the combination of a pair of jaws, one stationary and the other movable, said movable jaw provided with screw threads, a housing secured to said stationary jaw and having openings in its sides, a nut screw threaded mounted upon the screw threads of said stationary jaw and having oppositely arranged cut-out portions on its interior, spring elements secured to said housing and extending through said nut for frictionally engaging the threads of said nut when said movable jaw is in open position and adapted to engage the said recesses on the interior of said nut when said movable jaw is in locked position, and means mounted upon the outside of the nut for indicating the position of the threads on the interior of said nut.

4. In a wrench, the combination of a pair of jaws, one movable and the other stationary, the shank of said stationary jaw carrying a housing, the shank of said movable jaw provided with threads and extending longitudinally through said housing, a nut mounted upon the threads of the shank of said stationary jaw, springs extending through said nut and across the openings in the side of said housing and adapted to register with recesses provided in the threads of said nut when said nut is turned to locked position.

5. In a wrench, the combination of a pair of jaws, a shank for each of said jaws one of which is provided with screw threads, a housing mounted upon one of the shanks and having said screw threaded shank extending longitudinally through the housing, said housing provided with an opening in each of its sides, a nut surrounding said screw threaded shank and extending through the side openings in said housing, leaf springs secured to said housing at one edge thereof and extending through said nut and across the openings in the sides of said housing, said nut provided with recesses in which said leaf springs are adapted to register when said nut is turned to locked position, and characters stamped upon the outside of the nut for indicating the position of the threads on the interior of said nut.

In testimony whereof I affix my signature in presence of two witnesses.

JULIUS C. FJERDINGSTAD.

Witnesses:
GUSTAV F. SWANSON,
CARL F. C. KNUDSEN.